Patented Nov. 3, 1931

1,829,932

UNITED STATES PATENT OFFICE

EDMUND ALFRED HEY, OF ALAMEDA, CALIFORNIA, ASSIGNOR TO ROSE FIELD PACKING CO., INC., OF ALAMEDA, CALIFORNIA, A CORPORATION OF CALIFORNIA

METHOD OF PREPARING FOOD-STUFFS

No Drawing.  Application filed June 11, 1928.  Serial No. 284,666.

My invention relates in general to the art of preserving and has particular reference to a process of preparing vegetables, fruits and other like edible substances, so as to adapt them for human consumption, as, for example, the preparation of pickles from cucumbers.

The primary object of my invention is to provide a preserving process of the class described which will produce a product far superior to any that has heretofore been possible with old methods, and to enhance the appearance of the product, and improve its flavor, as well as to otherwise improve its qualities.

Another object of my invention and likewise an important feature is to reduce the time required for treating the foodstuff. To more clearly explain the characteristics of the invention, I will compare the same with the old method of preparing cucumbers in making pickles.

As heretofore practiced, cucumbers of a suitable size and texture are placed in receptacles and are therein submerged in a brine solution of varying strength, whereupon fermentation from natural causes develops and lactic acid forms which, together with the salt brine, produces a so-called cure, permitting the treated cucumbers to be stored from season to season.

Such properly cured cucumbers are then placed in suitable receptacles and washed to extract a fair proportion of the salt therefrom. After this washing treatment, they are placed in other suitable receptacles and are submerged in an acetic acid solution or vinegar. They remain in this solution for about ten days, after which time the acetic acid or vinegar solution is removed and replaced with a sugar and vinegar solution. The cucumbers remain in this solution from sixty to ninety days, after which time the sugar and vinegar solution is removed and replaced with a second stronger sugar and vinegar solution. This last part of the process is repeated from time to time until the cucumbers have reached the desired sweetness suitable to the particular manufacture. A frequent changing of liquor is necessary because if a liquor of sufficient strength in sugar to provide for the final degree of sweetness were added to the vegetable immediately upon coming from the salt extraction process, the vegetable would shrivel up and become unmerchantable. From the above, it will be readily seen that the method heretofore followed requires about ninety days' time in addition to the time consumed in the salt curing procedure.

As heretofore stated, one important feature of my invention is to reduce the time required for the treatment, and to this end, I provide a process which will reduce the ninety day time requirement to a matter of hours. I have also discovered that the method which I employ will improve the quality of the product in every respect so that it is involved with at least these two important improvements.

In carrying out my process, the same method of curing the cucumbers may be practiced except that, when desirable, more of the salt or brine solution may be extracted than in the heretofore practiced method, leaving the vegetable in nearly a neutral state. This is especially true in producing so-called sweet pickles by means of my improved method. The cucumbers are then, according to my invention, placed directly into a vinegar solution or other pickling solution of suitable strength contained in a receptacle which is preferably one in which live steam may be employed for heating the solution, for instance, a double boiler providing the well known outside open hot water bath into which live steam may be released for controlling the temperature of the bath. I also prefer that the cucumbers and the pickling solution be of substantially the same temperature at the commencement of the treatment. With the cucumbers in the solution, it is heated slowly to a temperature of 140° Fahrenheit or thereabout. At this point, suitable flavoring matter, such as sugar, in a given quantity, is introduced. Predetermined small amounts of flavoring matter are added from time to time at regular intervals, during which time the temperature is gradually raised so that by the time all of the flavoring matter has been added, the temperature has been raised to about 165° F. Ordinarily, the time involved in raising the temperature from about 145° F. to about 165° F. is about one hour. After all of the flavoring matter has been added, the heat is continued for about thirty minutes and the temperature is further gradually raised during this thirty minute period, to approximately 180° F. After this thirty minute period, in which the temperature has been raised to about 180° F., the operation is complete and the cucumbers can then be filled directly into the containers in which they are to be sold to the customer or they may be stored for future use.

From the above, it will be readily seen that my process reduces the time required from a matter of days to simply a matter of hours.

I have found that, in actual practice, my improved method acts on the chlorophyll of the pickle, which is the self-contained coloring matter of the pickle, and that the action of the heat brings back the original color of the pickle which has been somewhat discolored by the curing steps of the process. In the old method, the protracted treatment had a tendency to discolor the product rather than bring back its natural fresh green appearance.

Still another feature which is also highly desirable is the translucency of the finished product which results from my process and another feature is the fact that pickles manufactured under my process have a crispness not possible to obtain by heretofore practiced methods unless artificial astringents are employed.

The above explanation of the process has had to do primarily with the production of sweet pickles. In preserving sour or dill pickles, or possibly chow-chow, there may be no flavoring ingredient used. Otherwise, the process is practiced the same as in the preparation of sweet pickles, except that not so much of the salt is extracted as in producing sweet pickles. There are other modifications which should likewise be taken into consideration.

For instance, heretofore practiced methods do not allow the pickles to be finished until they have been completely cured out, and, here again, the time requirement is greatly saved by my process since the curing method has heretofore always required about six months. With my process, the pickles may be operated on at almost any stage in the process so that it is no longer necessary to wait months for the completion of the curing method.

Still another modification is that my process may be employed as a finishing method or process for pickles which have been started to be treated by the old method. In other words, my method may be substituted at any stage in the operation of the old method. As an example: As previously explained, with reference to the old method, there are several changes of liquor required and my process may be substituted at any of the various times that the liquor changes are made. In other words, cucumbers which are undergoing the pickling treatment according to the old method, which is not complete by any means, may be subjected to my improved process and finished up with considerable saving in time, as previously explained.

I also wish it to be perfectly clear that while I am describing the process in connection with the treatment of cucumbers for the production of pickles, it is not in any way limited to these food-stuffs, as it may be used in the treatment of any other vegetables or even fruits, providing, of course, that they are ultimately to be made into a class of product analogous to that of pickles.

The employment of heat in the pickling stages of the process opens the pores of the cucumbers and allows for very much quicker development and penetration of the treating solution including the flavoring ingredient, if any is used, than in the old method, which depends entirely on natural osmosis for the penetration of the solution including the flavoring ingredient. In other words, the employment of heat in substantially the manner specified in my process accounts for a comparatively rapid, osmosis and a much more thorough treatment than with the old methods.

As an outstanding example of my process, it is possible to create within a few hours, a high quality, translucent, sweet pickle, sour pickle, or dill pickle, highly preserved, which is far superior to any product that can be produced with the old method, taking into account flavor, color, crispness, and, as mentioned, translucency.

Obviously those skilled in the art may make various changes in the process and the specific method described without departing from the spirit and scope of the invention as defined by the appended claims, and I therefore do not wish to be limited to the precise process herein explained.

I claim:—

1. The process of flavoring pickles, which consists in subjecting the pickles first to flavoring liquor of low strength and then to a flavoring liquor of greater strength, the temperature of the first liquor and the temperature of the pickles being relatively low and not materially different when they are brought together, and said temperatures being raised simultaneously to a degree that promotes osmosis but resists shriveling while said first liquor is acting, and to a higher temperature while the stronger liquor is acting, and thereafter to a still higher temperature but not exceeding a degree materially less than boiling.

2. The process of curing and flavoring cucumbers and other like food articles, which consists in subjecting the articles to a curing solution, washing the articles, immersing the washed articles in a flavoring solution of relatively low strength while the flavoring solution and the articles are at approximately the same temperature, raising the temperature of the flavoring solution and contained articles to resist shriveling of the articles while the low strength flavoring solution is reacting, adding more flavoring ingredients to and increasing the strength of the solution from time to time, and simultaneously raising the temperature of the solution and contained articles to resist shriveling of the articles while the stronger flavoring solution reacts, and continuing the application of heat to the solution and contained articles after attainment of full strength of the flavoring solution and thereby further raising the temperature of the articles; the temperature attained by the weaker solution of flavoring solution being sufficient to arrest the fermentation of the curing step, and the highest temperature attained by the curing solution being materially below 212° F.

3. The process of curing and flavoring cucumbers and other like food articles, which consists in subjecting the articles to a curing solution, washing the articles, immersing the washed articles in a flavoring solution of relatively low strength while the flavoring solution and the articles are at approximately the same temperature, raising the temperature of the flavoring solution and contained articles to resist shriveling of the articles while the low strength flavoring solution is reacting, adding more flavoring ingredients to and increasing the strength of the solution from time to time, and simultaneously raising the temperature of the solution and contained articles to resist shriveling of the articles while the stronger flavoring solution reacts, and continuing the application of heat to the solution and contained articles after attainment of full strength of the flavoring solution and thereby further raising the temperature of the articles; the highest temperature attained being not materially over 180° F.

4. The process of curing and flavoring cucumbers and other like food articles, which consists in subjecting the articles to a curing solution, washing the articles, immersing the washed articles in a flavoring solution while the flavoring solution and the articles are at approximately the same temperature, gradually raising the temperature of the flavoring solution and contained articles to about 145° F., adding more flavoring ingredients to the solution from time to time and simultaneously gradually raising the temperature of the solution and contained articles to about 165° F., and thereafter continuing the application of heat to the solution and contained articles until the solution and articles are at a temperature of about 180° F.

5. The process of salt curing and flavoring cucumbers and other like food articles, which consists in curing the articles in a solution of brine, washing the articles until they are approximately neutral, immersing the washed articles in a flavoring solution while the flavoring solution and the articles are cold and at approximately the same temperature, gradually raising the temperature of the flavoring solution and contained articles to about 145° F., adding more flavoring ingredients to the solution from time to time through a period of about one hour and simultaneously in said period gradually raising the temperature of the solution and contained articles to about 165° F., and thereafter continuing the application of heat to the solution and contained articles for a period of about one-half an hour, and in the last-named period bringing the solution and articles to a temperature of about 180° F.

6. In the process of treating cucumbers and like edible vegetables and fruits steps which consist in subjecting such articles to a pickling solution which, while containing the articles being treated, is gradually heated to a pre-determined degree materially less than boiling and to which, at different stages of the increasing temperature, is added flavoring ingredients to increase the strength of the pickling solution.

7. In the process of treating cucumbers and like edible vegetables and fruits steps which consist in subjecting such articles to a pickling solution which, while containing the artiles being treated, is gradually heated to about 180 degrees F. and to which, at different stages of the increasing temperature, is added flavoring ingredients to increase the strength of the pickling solution.

8. In the process of flavoring pickles steps which consist in curing the article in a solution that develops fermentation; then transferring the cured pickles to a flavoring solution which is relatively weak and at a relatively low temperature; then raising the temperature of the weak solution and contained pickles to about 145 degrees F. thereby arresting the fermentation and partially flavoring the pickles; and then increasing the strength of the flavoring solution and raising its temperature while containing the pickles, to about 165 degrees F.

Signed at Alameda, California, this 2nd day of June, 1928.

EDMUND ALFRED HEY.